J. E. JOHNSON.
COFFEE POT.
APPLICATION FILED AUG. 1, 1913.
1,092,772.
Patented Apr. 7, 1914.
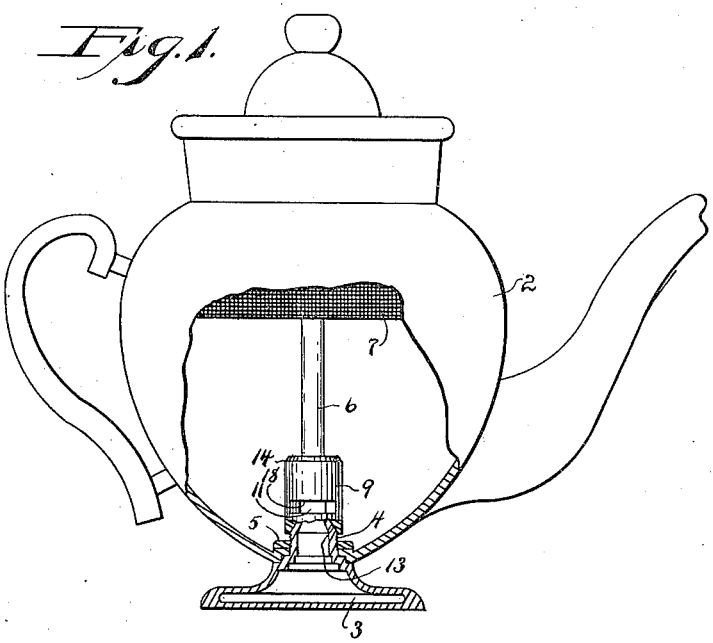
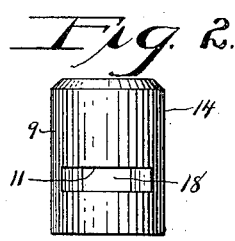
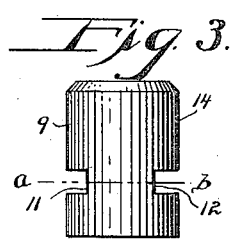
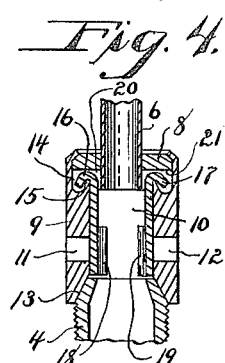
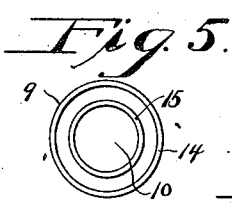
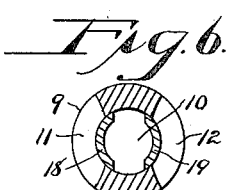
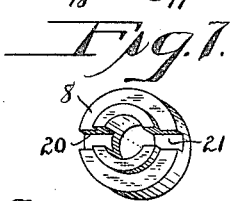
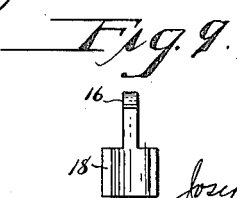
Witnesses
C. L. Weed
M. P. Nichols
Inventor
Joseph Edward Johnson
by Seymour & Earle
Attys

UNITED STATES PATENT OFFICE.

JOSEPH EDWARD JOHNSON, OF MERIDEN, CONNECTICUT.

COFFEE-POT.

1,092,772.  Specification of Letters Patent.  Patented Apr. 7, 1914.

Application filed August 1, 1913. Serial No. 782,517.

*To all whom it may concern:*

Be it known that I, JOSEPH EDWARD JOHNSON, a citizen of the United States, residing at Meriden, in the county of New Haven and State of Connecticut, have invented a new and useful Improvement in Coffee-Pots; and I do hereby declare the following, when taken in connection with the accompanying drawings and the characters of reference marked thereon, to be a full, clear, and exact description of the same, and which said drawings constitute part of this application, and represent, in—

Figure 1 a side view partially in section of a coffee pot constructed in accordance with my invention. Fig. 2 a side view of the valve block detached. Fig. 3 a side view of the same block looking at right angles to Fig. 2. Fig. 4 is a broken vertical sectional view through the block, upper end of the nipple and lower end of the central tube. Fig. 5 a top or plan view of the valve block. Fig. 6 a sectional view on the line $a-b$ of Fig. 4. Fig. 7 a perspective view of the disk or closure for the upper end of the valve block. Fig. 8 a side view of one of the valves detached. Fig. 9 a front or plan view of the same.

This invention relates to an improvement in coffee pots, and particularly to coffee pots of the percolator type.

The object of this invention is to provide a simple means for controlling the flow of liquid from the pot proper to the generating chamber, and simplify the construction shown in United States Letters Patent No. 1,059,049 granted to me April 15, 1913.

In carrying out my invention, I employ a coffee pot 2 of any particular design provided at the base with a generating chamber 3 at the top of which is a nipple 4 which is secured in the usual way by a locking-ring 5. In connection with a pot thus formed I employ the usual central tube 6 extending through the cup-like strainer 7 near the upper end of the tube and into which the coffee is placed, and the lower end of the tube is provided with a disk or flange 8 for the purpose as will hereinafter appear. Connected with this tube is a valve block 9 formed with a vertically arranged central opening 10 and with ports 11 and 12 opening into the chamber through the side walls of the block. The lower end of the chamber is formed with a recess 13 adapting the hooked block to closely fit over the upper end of the nipple 4. The upper end of the block is cut away to form a flange 14 the edge of which may be turned over the edge of the disk 8 so as to firmly interlock the block with the disk and hence with the tube 6. Within the flange and around the central opening 10 is an annular rib 15 which may be formed by milling and which provides seats for the hooked ends 16 and 17 of valves 18 and 19 which are respectively adapted to close the ports 11 and 12 and yet are free to swing inward to open the ports. To hold the upper ends of the valves in position, the under face of the disk 8 is formed with notches or grooves 20 and 21 which set over the hooked ends 16 and 17 of the valve and hence hold the valves upon their seats and prevent them from being turned out of line with the ports.

The operation of my percolator is substantially the same as other percolators, that is to say, liquid within the pot passes through the ports 11 and 12 and through the nipple into the generating chamber 3. When brought to a boiling point the liquid will be forced up through the tube 6 and into the strainer 7 and so as to percolate through the material placed in the strainer. The valves 18 and 19 yield as the liquid flows from the pot into the generating chamber but tightly close the ports as the liquid is forced up through the tube. This construction by firmly uniting the valve block to the stem avoids the possibility of derangement of the valves, and a block thus constructed is manufactured more cheaply than where means are provided for detachably connecting the central tube with a valve block.

I claim:—

1. The combination with a coffee pot provided with a generating chamber at its bottom and with a nipple at the upper end of said chamber, of a valve block formed with a vertical passage and adapted to closely fit the upper end of said nipple, said valve block formed on opposite sides with ports the upper end of the block recessed and formed with an annular rib, valves within the central passage provided at their upper ends with hooks adapted to bear upon said annular rib and at their lower ends to close said ports, and a central tube coupled with said valve block.

2. The combination with a coffee pot provided with a generating chamber at its bottom and with a nipple at the upper end of said chamber, of a valve block formed with a round vertical passage adapted at its lower end to closely fit over the upper end of said nipple, said block formed on opposite sides with ports, said block also formed at its upper end with an annular rib around the vertical passage and with an upwardly extending flange, valves suspended from said annular rib and adapted at their lower ends to close said ports, a central tube, and a disk fixed to the tube and coupled with said flange.

3. The combination with a coffee pot provided with a generating chamber at its bottom and with a nipple at the upper end of said chamber, of a valve block formed with a round vertical passage adapted at its lower end to closely fit over the upper end of said nipple, said block formed on opposite sides with ports, said block also formed at its upper end with an annular rib around the vertical passage and with an upwardly extending flange, valves suspended from said annular rib and adapted at their lower ends to close said ports, a central tube, a disk fixed to the tube and coupled with said flange, the under face of said disk formed with grooves adapting the disk to set over the upper ends of said valves whereby the valves are held in place.

In testimony whereof, I have signed this specification in the presence of two subscribing witnesses.

JOSEPH EDWARD JOHNSON.

Witnesses:
F. J. EKMARK,
P. C. GUMPRECHT.

---

Copies of this patent may be obtained for five cents each, by addressing the "Commissioner of Patents, Washington, D. C."